(12) United States Patent
Liu et al.

(10) Patent No.: US 12,210,976 B2
(45) Date of Patent: Jan. 28, 2025

(54) SYSTEMS AND METHODS FOR VIDEO REPRESENTATION LEARNING WITH A WEAK TEACHER

(71) Applicant: Salesforce.com, Inc., San Francisco, CA (US)

(72) Inventors: Hualin Liu, Singapore (SG); Chu Hong Hoi, Singapore (SG); Junnan Li, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 946 days.

(21) Appl. No.: 17/219,339

(22) Filed: Mar. 31, 2021

(65) Prior Publication Data
US 2022/0156593 A1    May 19, 2022

Related U.S. Application Data

(60) Provisional application No. 63/114,142, filed on Nov. 16, 2020.

(51) Int. Cl.
*G06N 3/084*    (2023.01)
*G06F 18/214*   (2023.01)
(Continued)

(52) U.S. Cl.
CPC ........ *G06N 3/084* (2013.01); *G06F 18/2155* (2023.01); *G06F 18/22* (2023.01); *G06N 3/088* (2013.01); *G06V 10/751* (2022.01)

(58) Field of Classification Search
None
See application file for complete search history.

(56) References Cited

U.S. PATENT DOCUMENTS 10,467,526 B1 *  11/2019  Appalaraju .......... G06V 10/774
2018/0232451 A1 *  8/2018  Lev-Tov .............. G06F 16/248
(Continued)

OTHER PUBLICATIONS

Wang et al., "Knowledge Distillation and Student-Teacher Learning for Visual Intelligence: A Review and New Outlooks," Apr. 13, 2020, https://arxiv.org/abs/2004.05937v1.*
(Continued)

*Primary Examiner* — Ryan Barrett
(74) *Attorney, Agent, or Firm* — Haynes and Boone, LLP

(57) ABSTRACT

Embodiments described herein provide systems and methods for learning representation from unlabeled videos. Specifically, a method may comprise generating a set of strongly-augmented samples and a set of weakly-augmented samples from the unlabeled video samples; generating a set of predictive logits by inputting the set of strongly-augmented samples into a student model and a first teacher model; generating a set of artificial labels by inputting the set of weakly-augmented samples to a second teacher model that operates in parallel to the first teacher model, wherein the second teacher model shares one or more model parameters with the first teacher model; computing a loss objective based on the set of predictive logits and the set of artificial labels; updating student model parameters based on the loss objective via backpropagation; and updating the shared parameters for the first teacher model and the second teacher model based on the updated student model parameters.

20 Claims, 6 Drawing Sheets

(51) Int. Cl.
*G06F 18/22* (2023.01)
*G06N 3/088* (2023.01)
*G06V 10/75* (2022.01)

(56) References Cited

U.S. PATENT DOCUMENTS

| | | | |
|---|---|---|---|
| 2020/0272940 A1* | 8/2020 | Sun | G06N 3/084 |
| 2021/0089882 A1* | 3/2021 | Sun | G06N 3/045 |
| 2022/0107645 A1* | 4/2022 | Kalantidis | G06T 9/002 |
| 2022/0156587 A1* | 5/2022 | Ebrahimpour | G06N 3/08 |
| 2022/0344049 A1* | 10/2022 | Hall | G06N 3/048 |
| 2022/0414476 A1* | 12/2022 | Lin | G06F 18/2185 |
| 2023/0162023 A1* | 5/2023 | Koike Akino | G06N 3/0455 |
| | | | 706/25 |
| 2024/0071056 A1* | 2/2024 | Huang | G06V 10/7753 |

OTHER PUBLICATIONS

Upadhyay, "Knowledge Distillation," Apr. 5, 2018, https://medium.com/neuralmachine/knowledge-distillation-dc241d7c2322.*

Hinton et al., "Distilling the Knowledge in a Neural Network," Mar. 9, 2015, https://arxiv.org/abs/1503.02531.*

* cited by examiner

SYSTEMS AND METHODS FOR VIDEO REPRESENTATION LEARNING WITH A WEAK TEACHER

CROSS-REFERENCE(S)

The present disclosure is a nonprovisional of and claims priority under 35 U.S.C. 119 to U.S. provisional application No. 63/114,142, filed Nov. 16, 2020.

TECHNICAL FIELD

The present disclosure relates generally to learning semantically-meaningful representation from unlabeled videos so that the semantically-related representation may improve performance on downstream tasks.

BACKGROUND

Contrastive learning is a form of unsupervised learning that uses an input of contrasting positive samples (e.g., different augmented versions of the same image) against negative samples (e.g., an augmented version of a different image) to pull samples that is originated from the same original image close while pushing away samples that are originated from different images in a feature space. The contrast between the positive and the negative samples at an instance level, referred to as contrastive instance discrimination, has been used to learn semantically-meaningful representation of image content. However, these methods often select semantically-similar samples as negatives and thus artificially forcing the corresponding representations as belonging to different classes, creating false negative results.

Therefore, there is a need for providing an improved contrastive learning framework to learn representation from unlabeled videos.

Figure 1:
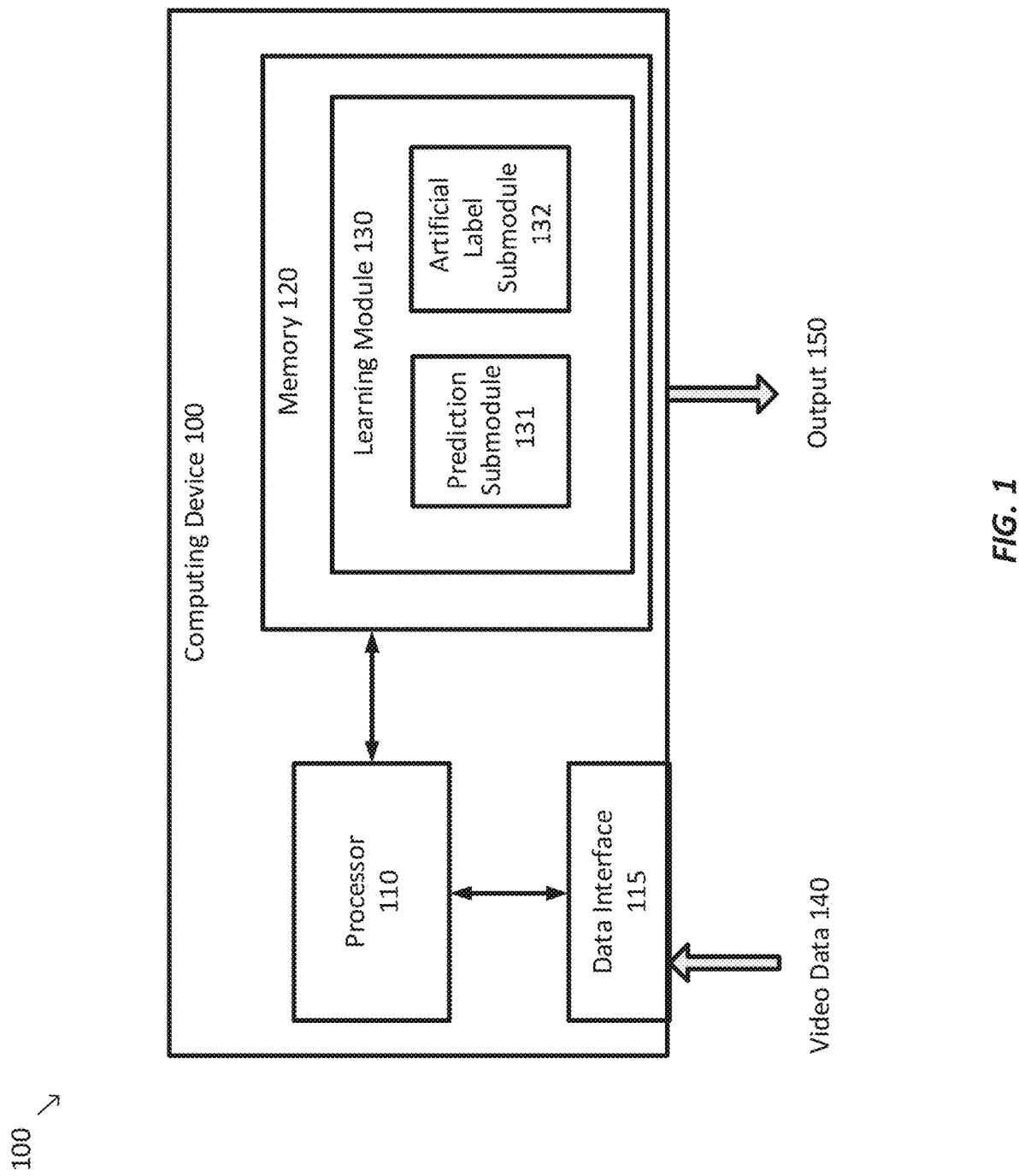
FIG. 1 is a simplified diagram of an example computing device for implementing video representation using a learning module, according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

The usage of one-hot labels is limited because it encourages the model to push away all negative pairs, therefore creating false negatives. Existing contrastive learning methods require a large number of negative samples, so the memory queue inevitably contains samples that are semantically-similar to the query. The use of a weak teacher framework to create an artificial label based on weakly-augmented images and one-hot labels addresses the limitations of the usage of only one-hot labels. By doing so, the weak teacher framework can mine potential positives from semantically-similar samples from negative samples and keep them closer to the query instance.

In view of a need to improve representation learning, embodiments described herein utilizes a teacher/student training framework, in which two teacher models operated in parallel and one of the teacher models operates on weakly-augmented samples to compute a similarity distribution over the weakly-augmented samples to create an artificial label. The artificial label can then be used by the other teacher model to mine potential positives from negative samples, therefore reducing false negative results.

Embodiments described herein are not limited to video representation learning, but can be generally applied to any representation learning, such as speech representation learning, audio representation learning or audiovisual representation learning.

FIG. 1 is a simplified diagram of a computing device for implementing video representation using a learning module, according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a learning module 130 that may be used to implement and/or emulate the systems and models, and/or to implement any of the methods described further herein. In some examples, the learning module 130, may receive an input 140, e.g., such as video data, via a data interface 115. The data interface 115 may be any of a user interface that receives the user utterance, or a communication interface that may receive or retrieve a context history from the database. The learning module 130 may generate an output 150 such as a loss function. In some implementations, the output 150 may be used to update a neural model.

In some embodiments, the learning module 130 includes a prediction submodule 131 and an artificial label submodule 132. Specifically, the prediction submodule 131 is configured to generate predictions from augmented video clips. The predictions are based on a probability that a query matches augmented keys across all possible keys. The augmented keys are weakly-augmented or strongly-augmented.

The artificial label submodule 132 is configured to generate an artificial label at least based on weakly-augmented clips. Specifically, the artificial label is generated by a combination of (i) normalized pairwise similarity between query and keys from weakly-augmented images and (ii) a synthetic one-hot label such as synthetic positive similarity.

In some examples, the learning module 130 and the sub-modules 131-132 may be implemented using hardware, software, and/or a combination of hardware and software.

Figure 2:
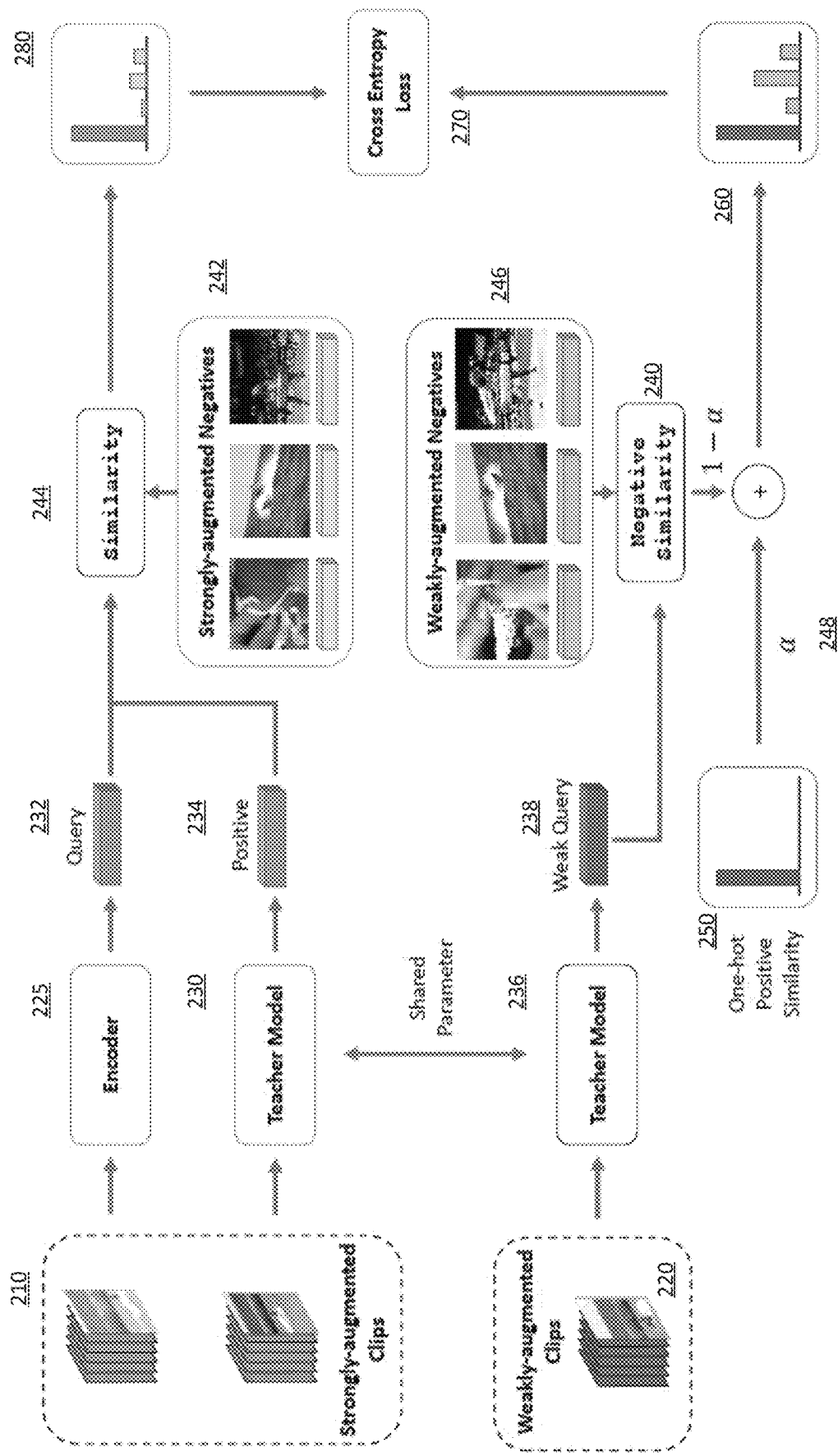
FIG. 2 is a block diagram illustrating an example architecture of using a neural model that implements the submodules in FIG. 1, according to one embodiment.

FIG. 2 is a diagram illustrating an example architecture of a teacher-student contrastive learning framework that implements the learning model 130 in FIG. 1, according to one embodiment. The framework includes an encoder 225, a first teacher model 230, and a second teacher model 236 that is operated in parallel with the first teacher model 230. The second teacher model 236 shares the same parameter with the first teacher model 230. The encoder 225 and the first teacher model 230 may form a contrastive learning branch. The second teacher model 236 may utilize weakly-augmented image samples to generate additional supervisory signals in the form of a distribution over negative samples. This probability distribution can be used to smooth the original one-hot label as the new contrastive learning target. In this way, visually similar positives can be mined from a pool of negative samples, which facilitates learning of semantically-meaningful representations.

Specifically, the framework may receive an input video and samples a plurality of clips from the input video. For example, a first set of clips are applied with strong augmentation to generate strongly-augmented clips 210, and a second set of clips are applied with weak augmentation to generate weakly-augmented clips 220. For instance, the strongly-augmented clips may be obtained by any combination of random scaling, random horizontal flip, color jitter, random gray and Gaussian Blur, and the weakly-augmented clips may be obtained by any combination of scaling and center cropping.

The strongly-augmented clips 210 are sent to the encoder 225 and the teacher model 230 in parallel. The student-teacher combination of encoder 225 and the teacher model 230 may generate a strong prediction 280 (e.g., a probability distribution or predictive logits) by a strong teacher model 230 and a student model (e.g., encoder 225) based on training a neural network model by using contrastive learning. Contrastive learning is a form of unsupervised learning that learns representation by contrasting positive pairs against negative pairs. Particularly, input clips are firstly sampled from videos, and then a strong augmentation, such as a strong spatial augmentation, is applied to the sampled clips. After the strong augmentation is applied, strongly-augmented clips can be fed through an encoder, such as a convolutional neural network (CNN) encoder, to produce feature embedding of the strongly-augmented clips, e.g., encoded query instances and encoded key instances.

For example, a query representation (e.g., query 232) is encoded by a student model (e.g., encoder 225, such as a convolutional neural network encoder) to be represented as $f_s(x^q)$, where $x^q$ represents the query instance. A positive key presentation (e.g., positive key 234) are encoded by a teacher model 230 (such as a momentarily updated encoder), as $f_s(x^q)$, where $x^q$ represents the query instance. In some embodiments, the structures of the encoder 225 and the strong teacher model 230 are the same. In other embodiments, the structures of the encoder 225 and the strong teacher model 230 are different.

A similarity 244 can be generated by comparing a positive pair of the query representation (e. g., query 232) and a positive key representation (e.g., positive key 234) with negative pairs of the query and negative key representations corresponding to the query representation in an encoded feature space. A set of predictive logits 280 can be generated based on the similarity 244 and strongly-augmented negatives 242.

In some embodiments, artificial labels may be generated by encoding, by the second teacher model 236, the set of weakly-augmented samples 220 into a weak query representation 238. A negative similarity 240 may be generated based on the weak query representation 238 with weakly-augmented negative key representations 246.

A set of one-hot labels 250 corresponding to a plurality of key representations can be generated from the strongly-augmented samples 220. A set of artificial labels can be generated by weighted combination of the one-hot labels 250 and the negative similarity 240 according to a mixed ratio 248, e.g., by the submodule 132 based on the neural model. The mixed ratio 248 can be adjusted by linearly reducing the mixed ratio for a ramping step for each training epoch.

In some embodiments, a separate memory queue can be used to store all weakly-augmented clips. The weak teacher model 236 can operate in parallel to the strong teacher model 230 and can share one or more model parameters with the strong teacher model 230. The term, "in parallel," is not equivalent to simultaneously. It can refer to that the two things are related in some ways, happening at approximately the same time, or going in the same direction.

In particular embodiments, w is used as the representation of weak query clip and $k^w$ is used to stand for representations of weakly-augmented key clips 220 in FIG. 2. The weak prediction, such as the matching probability from the teacher's prediction on weak videos $p_w$, is similar to the student's probability $p_s$ (i.e., predictive logits) with two subtle differences. First, a weakly-augmented clip w is used as weak query (e.g., weak query 238). Second, there is no positive key. Therefore, $p_w$ can only specify the probability for negative pairs:

$$p_w(k_i^w; w, \theta_t) = \frac{\exp(w \cdot k_i^w / T)}{\sum_{j=0}^{k^w} \exp(w \cdot k_j^w / T)}$$

Where $K^w$ stands for the number of weakly-augmented keys.

Negative instances can be sampled from memory queues in a First-In-First-Out manner, hence the order of negative samples in two memory queues is the same.

In some embodiments, once $p_w$ is acquired, the artificial label 260 can be represented as s and can be generated by a weighted combination of a one-hot positive probability r and negative probability with mix ratio α (as represented as 248 in FIG. 2). The one-hot label r can be obtained by:

$$\text{One-hot label } r(k_i) = \begin{cases} 1 & \text{if } k_i = k^+ \\ 0 & \text{otherwise} \end{cases}$$

where $k_i$ denotes a key representation. The artificial label s is then computed as:

$$s = \alpha r + (1-\alpha) p_w$$

The learning module 130 then computes a loss function 270 (e.g., cross entropy loss) based on the strong prediction (predictive logits 280) and the artificial label 260 and updates the student model's parameters based on the computed loss function 270. The shared parameters for the first teacher model (e.g., strong teacher model 230) and the second teacher model (e.g., weak teacher model 236) can be updated based on the updated student model's parameters.

For example, a loss function can be defined as a standard cross-entropy loss 250 between smooth label s and student's prediction $p_s$ (i.e., predictive logits):

$$\mathcal{L}_{CE} = -\sum_{k_i=0}^{K} s(k_i) \log(p_s(k_i))$$

The artificial label 260 can be used as the label for contrastive learning to backpropagate gradients to the encoder 225 to generate a trained model. During training, the parameters $\theta_t$ of the teacher model (e.g., the teacher models 230 and 236) are updated at each step as the exponential-moving-average of the student model (e.g., the encoder 225)'s parameters $\theta_s$. The weight update formula for the teacher model is given below.

$$\theta_t^* = \lambda \theta_t + (1-\lambda) \theta_s^* \quad (2)$$

Where λ represents the momentum. * represents the new weight.

By involving weakly-augmented videos, this weak teacher method is able to utilize informative weakly-augmented videos to prevent pushing away potential positive videos.

In some embodiments, weak probability is not accurate and may affect performance at the beginning of training because the encoder is not sufficiently trained. To avoid this, a linear ramping strategy can be used to dynamically adjust the mix ratio. For example, the mix ratio is firstly set to 1 and gradually reduced to target value within fixed ramping steps. Before approaching the target value, the mix ratio is updated every epoch by:

$$\text{Mix Ratio } \alpha_n = \max\left(\alpha_{min}, 1 - \frac{n(1-\alpha_{min})}{N}\right)$$

Where the target mix ratio is denoted as $\alpha_{min}$. The current epoch is represented by n and the number of total ramping steps is represented as N.

In one embodiment, at the initial stage of training, a contrastive loss with the one hot label (denoted by InfoNCE) may be used when the weak prediction is inaccurate. For example, the loss function may be a cross entropy between predictive logits $p_s$ and one-hot label r which has a value of 1 for positive pair and 0 for negative pairs.

$$\text{Predictive Logits } p_s(k_i; q, \theta_s) = \frac{\exp(q \cdot k_i)}{\sum_{j=0}^{K} \exp(q \cdot k_j / T)}$$

$$\text{One-hot label } r(k_i) = \begin{cases} 1 & \text{if } k_i = k^+ \\ 0 & \text{otherwise} \end{cases}$$

The contrastive loss can be written in the cross-entropy form.

$$\mathcal{L}_{InfoNCE} = -\sum_{k_i=0}^{K} r(k_i) \cdot \log(p_s(k_i))$$

As the weak prediction gains its accuracy, the one hot label may be gradually switched (e.g., with linear ramping of the ratio $\alpha_n$ described above) to the smooth artificial label 260, and the loss $\mathcal{L}_{CE}$ computed at 250 may be used.

Figure 3:
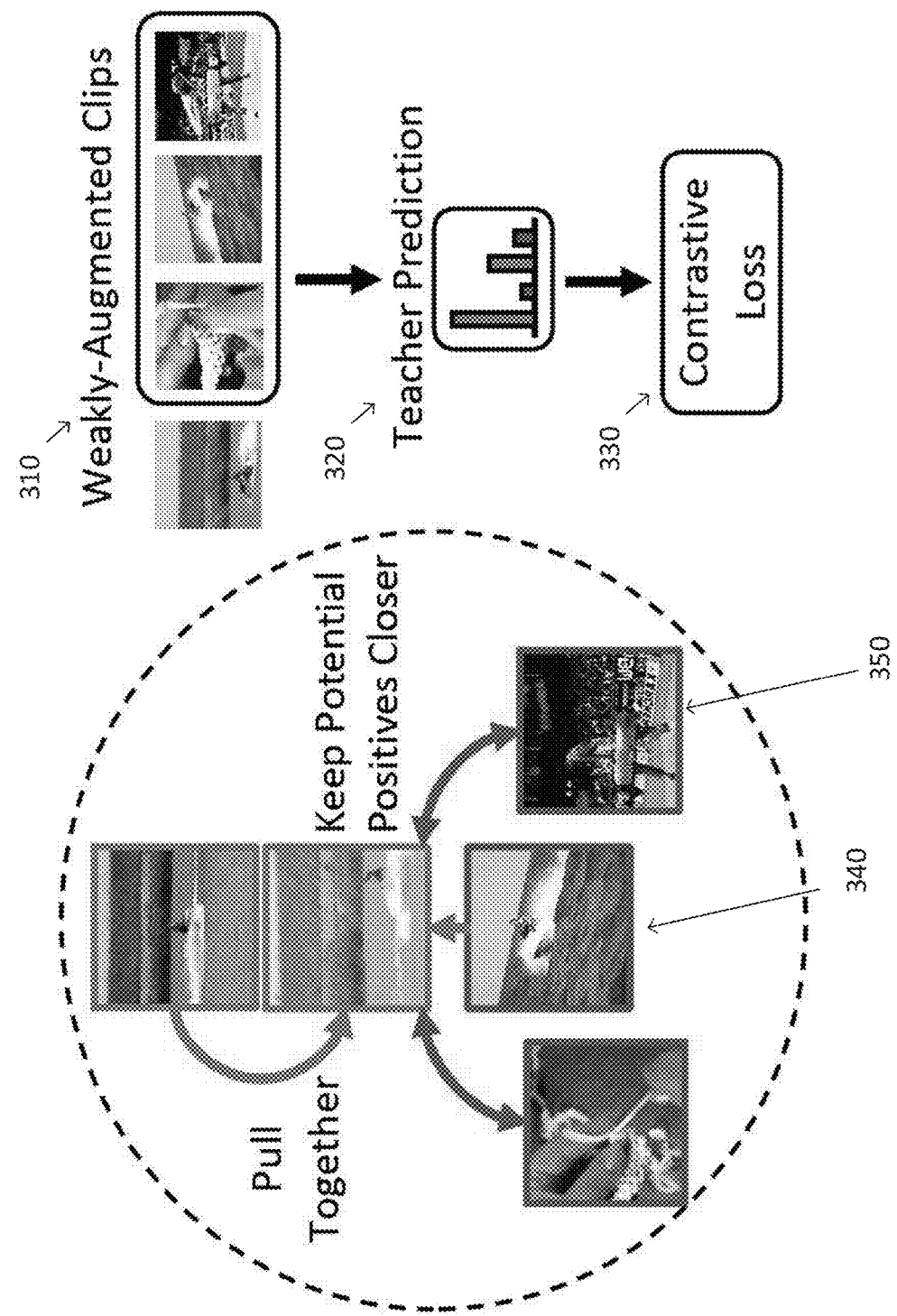
FIG. 3 is a diagram illustrating an example architecture of using a neural model that implements the submodules in FIG. 1, according to one embodiment.

FIG. 3 is a diagram illustrating an example architecture of using a learning model 130 that implements the submodules 131-132 in FIG. 1, according to one embodiment. Specifically, a learning module 130 samples a plurality of clips from the input video as queries. For example, as shown in FIG. 3, a learning module 130 can use weakly-augmented clips 310 to improve video representation learning. The model 130 can use teacher predictions 320 from weakly-augmented video clips 310 as the learning target. Contrastive loss 330 can be generated by the model 130 by calculating a first distance between a positive example and another example of the same class and contrasting the first distance with a second distance between two negative examples. The model 130 can then use the contrastive loss 330 to backpropagate gradients to generate a trained model for mining potential positives 340 in negative samples 350 and keep them closer to query clips.

Figure 4:
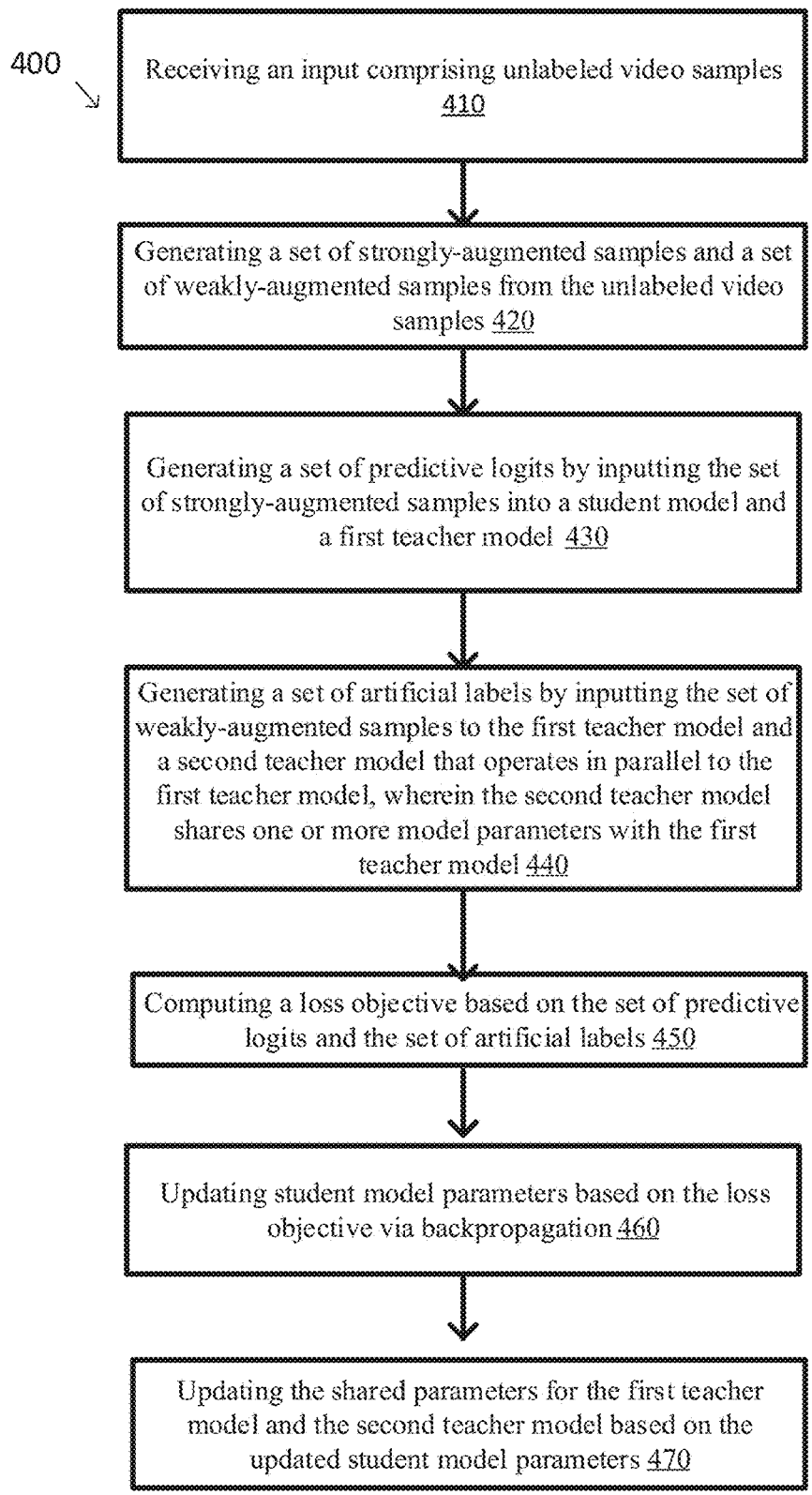
FIG. 4 is a simplified logic flow diagram illustrating an example method that implements the submodules in FIG. 1, according to some embodiments.

FIG. 4 is a simplified logic flow diagram illustrating a method 400 for video representation learning that implements the submodules 131-132 in FIG. 1, according to some embodiments. One or more of the processes 410-470 of method 400 may be implemented, at least in part, in the form of executable code stored on non-transitory, tangible, machine-readable media that when run by one or more processors may cause the one or more processors to perform one or more of the processes 410-470. In some embodiments, method 400 may correspond to the method used by the module 130.

At process 410, an input comprising video data may be received, e.g., via the data interface 115 in FIG. 1.

At process 420, a set of strongly-augmented samples and a set of weakly-augmented samples can be generated from the unlabeled video samples. Both weak and strong augmentations can be applied to unlabeled video samples. Strong augmentations can be applied by applying a series of framewise operations: random scale, random horizontal flip, color jitter, random gray and Gaussian Blur. For weak augmentations, preserve more information can be preserved for accurate positive mining by scaling the clip and taking a center crop. In some embodiments, all augmentations are temporally-consistent (e.g. the same augmentation is applied to every frame in the clip).

In strong augmentation, besides spatial augmentations, temporal augmentation can be applied between the query and strongly-augmented key. Clips can be taken from random starting points because clips from one video may have similar high-level semantics. In this way, the augmentation keeps the same action semantics but introduce change of pose, change of lighting, and sometimes object occlusion, etc. It is considered as a very strong augmentation.

At process 430, a set of predictive logits can be generated by inputting the set of strongly-augmented samples into a student model and a first teacher model. For example, the predictive logits can be generated by one or more of: encoding the set of strongly-augmented samples into a query representation by the student model; encoding the set of strongly-augmented samples into a plurality of key representations by the teacher model; generating a similarity by comparing a positive pair of the query representation and a positive key representation with negative pairs of the query and negative key representations corresponding to the query representation in an encoded feature space; and generating the set of predictive logits based on the similarity For example, it can be expressed as:

$$\text{Predictive Logits } p_s(k_i; q, \theta_s) = \frac{\exp(q \cdot k_i)}{\sum_{j=0}^{K} \exp(q \cdot k_j / T)}$$

At process 440, a set of artificial labels can be generated by inputting the set of weakly-augmented samples to the first teacher model and a second teacher model that operates in parallel to the first teacher model, wherein the second teacher model shares one or more model parameters with the first teacher model. For example, at least one of the set of artificial labels is generated by one or more of: encoding the set of weakly-augmented samples into a weak query representation by the second teacher model; generating a negative similarity based on the weak query representation with weakly-augmented negative key representations; generating a set of one-hot labels corresponding to a plurality of key representations generated from the strongly-augmented samples; and computing the set of artificial labels by weighted combination of the one-hot labels and the negative similarity according to a mixed ratio.

In some embodiments, the mixed ratio may be adjusted dynamically, for example, by a ramping step for each training epoch. For example, the mixed ratio can be adjusted in linear ramping steps of about 20, 30, 40, 50, 60, 70, 80, 90, 100, 110, 120, 130, 140, 150, 160, 170, 180, 190, 200 steps or any intermediate numbers or ranges. In alternative embodiments, the mixed ratio can be fixed. The mixed ratio can be fixed to be a target value or can be adjusted from 1 to a target value. The target value can be any number between 0 and 1. For example, the mixed ratio can be fixed to be 0.8 or 0.7 or can be adjusted from 1 to 0.8 or 0.7.

At process 450, a loss objective may be computed based on the set of predictive logits and the set of artificial labels. For example, the loss objective can be defined as a standard cross-entropy loss between artificial smooth label s and student's prediction $p_s$ (i.e., predictive logits):

$$\mathcal{L}_{CE} = -\sum_{k_i=0}^{K} s(k_i) \log(p_s(k_i))$$

At process 460, the student model parameters may be updated based on the computed loss objective via backpropagation. At process 470, the shared parameters for the first teacher model and the second teacher model may be updated based on the updated student model parameters.

Some examples of computing devices, such as computing device 100 may include non-transitory, tangible, machine readable media that include executable code that when run by one or more processors (e.g., processor 110) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

EXAMPLES

Exemplary experiments were conducted to evaluate performance of the learned video representation based on systems and methods as described herein. The feature's transferability was tested on two downstream tasks: action recognition and video retrieval tasks.

Dataset and Implementation

There are two action recognition datasets used in the experiments. One is the UCF101 dataset which has 13,320 realistic videos from 101 human action classes. The other is HMDB51 with 6,766 videos from 51 distinct action classes. A visual encoder was pre-trained on the UCF101 dataset. Pre-training on large-scale pre-training datasets such as Kinetics-400 and Kinetics-600 can be also used in alternative and additional embodiments. All pre-training and evaluation were conducted on split 1 of the datasets.

Visual encoder used a S3D model. For each video instance, three clips of 16 frames was extracted at 30 fps as input clips with a temporal down-sample rate of 2. In this way, one clip would cover around 1 second.

The input video has 224×224 resolution. During self-supervised training, Adam was used as an optimizer with an initial learning rate of 5e-4 and a weight decay of 1e-5. The model was trained with a batch size of 64 for 500 epochs. The learning rate was reduced by multiplying 0.1 at epoch 300 and 400. All experiment results were obtained using this self-supervised setting unless otherwise notified. Generally, it takes 25 hours to pre-train the encoder on the UCF101 dataset.

For the implementation of weak teacher methods as described herein, the temperature parameter $\tau$ was chosen to be 0.07 and the mix ratio was chosen to be 0.8 to combine one-hot label and weak label. Besides, the mix ratio was linearly ramped down from 1 to target value of 0.8 over 150 epochs. In ablation studies, the effect of different hyperparameters was analyzed.

Task 1—Action Classification.

There are two common evaluation protocols used in these experiments, namely Linear Probe and Finetune. The learned representation was evaluated on both Linear Probe and Finetune settings. Many self-supervised learning frameworks have been proposed in these years. Here, the most recent ones trained with visual-only features were listed for comparison. There are two types of visual modalities (RGB frames and optical flow) used in previous works.

For this Linear Probe setting, after pre-training, a frozen visual encoder was used as the backbone and a separate linear classifier was added on top. Then, the model was trained in a supervised-learning manner with real labels. During training, the Batch Normalization layer in the backbone was set to be evaluation mode to prevent any changes to the pre-trained encoder. Most of the augmentation strategies in self-supervised training without Gaussian Blur was followed. In the inference stage, clips were densely sampled from video with a sliding window of half of the video sequence length. Then, the ten-crop protocol was used for evaluation: horizontal flipping plus five crops (center crop+ four corners).

The Linear Probe experiment results are shown in Table 1. There are several points from the results which are worth mentioning. First, the Weak Teacher method as described herein can outperform InfoNCE implemented in the current SOTA method CoCLR by a large margin (53.3% v.s. 46.8%). InfoNCE, where NCE stands for Noise-Contrastive Estimation, is a type of contrastive loss function used for self-supervised learning.

Second, with a tiny amount of data (⅟₂₈ of K400 dataset and ⅟₂₇₃ of K600 dataset), fewer input modalities and much shorter training time (25 h on UCF101 instead of 1 week or more for Kinetics training), the Weak Teacher method as described herein can achieve comparable or even better results compared to recent self-supervised learning baselines like CBT and MemDPC.

In this Finetune setting, the whole visual encoder was finetuned end-to-end to compare with other state-of-the-art methods. To prevent overfitting on UCF101, a strong dropout rate of 0.9 and large weight decay 1e-3 is used. The ten-crop evaluation protocol was applied during inference as described previously.

The results are shown in the Table 1. It can be observed that Weak Teacher's improvement over CoCLR InfoNCE is marginal, which is understandable since the self-supervised pre-training and fine-tuning is on the same dataset. Therefore, finetuning result on HMDB51 would be a better benchmark to reflect the quality of representation. It is apparent from the table that the representation by the Weak Teacher can outperform the baseline by 3%. Experiment results from both linear probe and finetuning results are shown in this table. In left columns, the pre-training settings in terms of dataset, backbone architecture, number of parameters and input modality are listed. In right columns, top-1 classification accuracy is reported for both datasets. Notice that in the Dataset column, total video dataset duration is specified by number of days ('d') in brackets. In the Modality column, 'RGB' represents RGB frames and 'O' represents the optical flow. *stands for results run by released code and checkpoint.

TABLE 1

Comparison of Representation learned from Visual Features on action classification on UCF101 and HMDB51 datasets.

| Method | Dataset (Duration) | Arch | Params(M) | Modality | UCF101 Acc@1 | HMDB51 Acc@1 |
|---|---|---|---|---|---|---|
| Linear Probe Setting: | | | | | | |
| InfoNCE | UCF101 (1 d) | S3D | 7.9 | RGB | 46.8 | 26.0* |
| Weak Teacher | UCF101 (1 d) | S3D | 7.9 | RGB | 53.3 | 30.3 |
| CBT | K600 (273 d) | S3D | 8.8 | RGB | 54.0 | 29.5 |
| MemDPC | K400 (28 d) | R-2D3D | 32.6 | RGB + O | 54.1 | 30.5 |
| CoCLR | K400 (28 d) | S3D | 7.9 | RGB + O | 77.8 | 52.4 |
| Finetuning Setting: | | | | | | |
| Jigsaw | UCF101 (1 d) | CaffeNet | 5.8 | RGB | 51.5 | 22.5 |
| Buehler | UCF101 (1 d) | CaffeNet | 17.5 | RGB | 58.6 | 25.0 |
| OPN | UCF101 (1 d) | VGG | 33.1 | RGB | 59.8 | 23.8 |
| VCP | UCF101 (1 d) | C3D | 7.9 | RGB | 68.5 | 32.5 |
| VCOP | UCF101 (1 d) | R(2 + 1)D | 7.9 | RGB | 72.4 | 30.9 |
| InfoNCE | UCF101 (1 d) | S3D | 17.5 | RGB | 78.4 | 40.4* |
| Weak Teacher | UCF101 (1 d) | S3D | 33.1 | RGB | 79.4 | 43.7 |
| 3D-RotNet | K400 (28 d) | R3D | 33.6 | RGB | 62.9 | 33.7 |
| ST-Puzzle | K400 (28 d) | R3D | 33.6 | RGB | 63.9 | 33.7 |
| CBT | K600 (273 d) | S3D | 8.8 | RGB | 79.5 | 44.6 |
| SpeedNet | K400 (28 d) | S3D-G | 11.6 | RGB | 81.1 | 48.8 |
| MemDPC | K400 (28 d) | R-2D3D | 32.6 | RGB | 78.1 | 41.2 |

TABLE 1-continued

Comparison of Representation learned from Visual Features
on action classification on UCF101 and HMDB51 datasets.

| Method | Dataset (Duration) | Arch | Params(M) | Modality | UCF101 Acc@1 | HMDB51 Acc@1 |
|---|---|---|---|---|---|---|
| MemDPC | K400 (28 d) | R-2D3D | 32.6 | RGB + O | 86.1 | 54.5 |
| DynamoNet | Youtube8M (58 d) | STC-Net | — | RGB | 88.1 | 59.9 |
| CoCLR | K400 (28 d) | S3D | 7.9 | RGB + O | 90.6 | 62.9 |
| CVRL | K400 (28 d) | R3D | 36.1 | RGB | 92.1 | 65.4 |
| Supervised | K400 (28 d) | S3D | 8.8 | RGB | 96.8 | 75.9 |

Task 2—Video Retrieval

To test the feature's transferability, the learned representation was evaluated in the video retrieval task. Video features were extracted with a pre-trained video encoder and were directly used for nearest-neighbor retrieval in the dataset. No training or finetuning is needed in this process. Since clips may be from the same video with similar visual appearances, the raining set was queried using testing set videos.

The results are shown in Table 2, top-k recall for both UCF101 and HMDB51 datasets was recorded. This evaluation metric would count a retrieval as successful whenever the correct video is found in top-k nearest neighbors. As can be seen from the table, the Weak Teacher method improved InfoNCE base-line by 3-5% in UCF101 R@1 and outperformed all current frame-only self-supervised learning methods by over 15% in UCF101 R@1 and around 10% in HMDB51 R@1. Though CoCLR has better results than the Weak Teacher method, CoCLR use averaged predictions from RGB frames and optical flows. Notice CoCLR uses both RGB frames and optical flows. The top-K recall (R@k) on both UCF101 and HMDB51 datasets is reported. 'RGB' represents RGB frames and 'O' represents the optical flow in the Modality column. *Video Retrieval results obtained by running released code and checkpoint.

Visualization of Weak Teacher Prediction

To better understand how Weak Teacher mines the potential positives in the negative memory queue, the top 3 weak negatives with the highest probabilities were visualized in the teacher model's prediction. The frames and corresponding labels for the clips were displayed.

Figure 5:
FIG. 5 illustrates an example visualization of weak prediction with given query clips.
Figure 5:
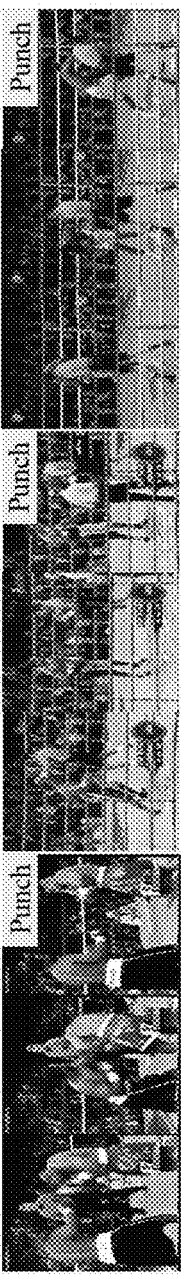
Figure 5:
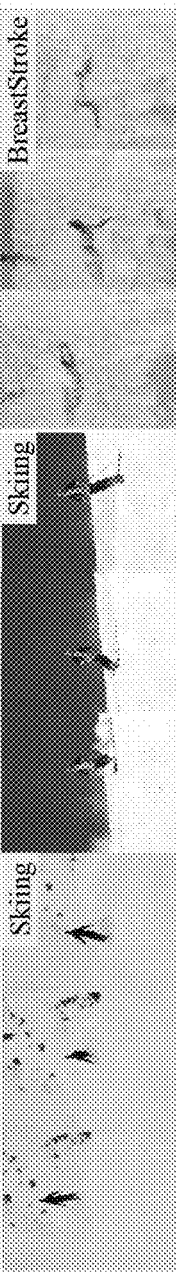
Figure 5:
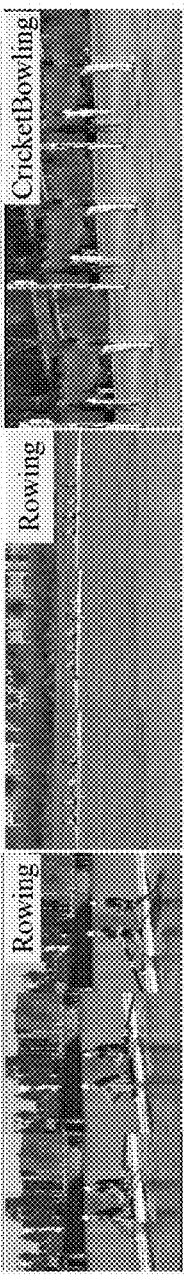
Figure 5:

FIG. 5 illustrates an example visualization of weak prediction with given query clips. The top 3 "negative clips" from UCF101 dataset with the highest probabilities were visualized in weak prediction. The weak prediction is calculated over a memory queue with K=2048. Notice that weak negatives with highest probability is put at the left side. The action labels are marked on the top right of frames.

As shown in FIG. 5, top weak predictions of Weak Teacher are from the same or semantically-similar action categories. It empirically validates the assumption that weak prediction implicitly mines the potential positives. The positive mining by weak teacher is effective since the encoder was trained without any labels.

Ablation Studies

To understand why Weak Teacher improves the performance of contrastive learning, several ablation experiments were conducted to observe the effect of different hyperparameters used, specifically the mix ratio and the linear ramping steps. The experiment setting is as follows: visual

TABLE 2

Comparison of Representation learned by using Visual Features
on Video Retrieval task on UCF101 and HMDB51 datasets

| Method | Dataset | Modality | UCF101 | | | | HMDB51 | | | |
|---|---|---|---|---|---|---|---|---|---|---|
| | | | R@1 | R@5 | R@10 | R@20 | R@1 | R@5 | R@10 | R@20 |
| Jigsaw | UCF101 | RGB | 19.7 | 28.5 | 33.5 | 40.0 | — | — | — | — |
| OPN | UCF101 | RGB | 19.9 | 28.7 | 34.0 | 40.6 | — | — | — | — |
| Buchler | UCF101 | RGB | 25.7 | 36.2 | 42.2 | 49.2 | — | — | — | — |
| VCOP | UCF101 | RGB | 14.1 | 30.3 | 40.4 | 51.1 | 7.6 | 22.9 | 34.4 | 48.8 |
| VCP | UCF101 | RGB | 18.6 | 33.6 | 42.5 | 53.5 | 7.6 | 24.4 | 36.3 | 53.6 |
| MemDPC | UCF101 | RGB | 20.2 | 40.4 | 52.4 | 64.7 | 7.7 | 25.7 | 40.6 | 57.7 |
| SpeedNet | K400 | RGB | 13.0 | 28.1 | 37.5 | 49.5 | — | — | — | — |
| InfoNCE* | UCF101 | RGB | 35.0 | 52.7 | 61.8 | 71.2 | 14.5 | 35.9 | 49.9 | 62.6 |
| Weak Teacher | UCF101 | RGB | 40.2 | 55.8 | 64.3 | 73.3 | 17.1 | 36.8 | 50.9 | 65.5 |
| CoCLR | UCF101 | RGB + O | 55.9 | 70.8 | 76.9 | 82.5 | 26.1 | 45.8 | 57.9 | 69.7 | encoder is firstly pre-trained for 500 epochs and the learned representation is then tested with linear probe setting. Both pre-training and testing are conducted on UCF101 split 1.

The linear ramping strategy was evaluated for its impact on performance in the weak teacher method. The Weak Teacher was compared with two strong InfoNCE baselines and the results were reported with different linear ramping steps in Table 3. Since this hyperparameter is related to training epochs, it is important to note that the learning rate is decayed to 1/10 at 300 and 400 steps during training. Comparison of performance of learned representation under the Linear Probe setting on UCF101. Left column refers to experiment settings. Notice that learning rate is decayed to 1/10 when reaching 300 and 400 steps.

TABLE 3

Ablation Studies on Linear Ramping of Weak Teacher Algorithm.

| Method | UCF101 Acc@1 | Retrieval R@1 |
|---|---|---|
| InfoNCE | 46.8 | 33.1 |
| InfoNCE | 48.1 | 36.2 |
| Weak Teacher$_{N=0}$ | 49.4 | 37.2 |
| Weak Teacher$_{N=50}$ | 50.1 | 37.1 |
| Weak Teacher$_{N=150}$ | 53.3 | 40.2 |
| Weak Teacher$_{N=250}$ | 49.6 | 37.8 |

As seen from the table, it appears that even without any linear ramping, the weak teacher method is able to improve the InfoNCE baseline (48.1%→49.4%). Despite the improvement, other rows with more ramping steps outperform the no linear ramping result and the performance reaches its peak when N=150. This result supports the use of the linear ramping strategy.

To further validate the assumption that initial weak prediction is inaccurate, a graph of max probability in weak prediction was plotted during training.

Figure 6:
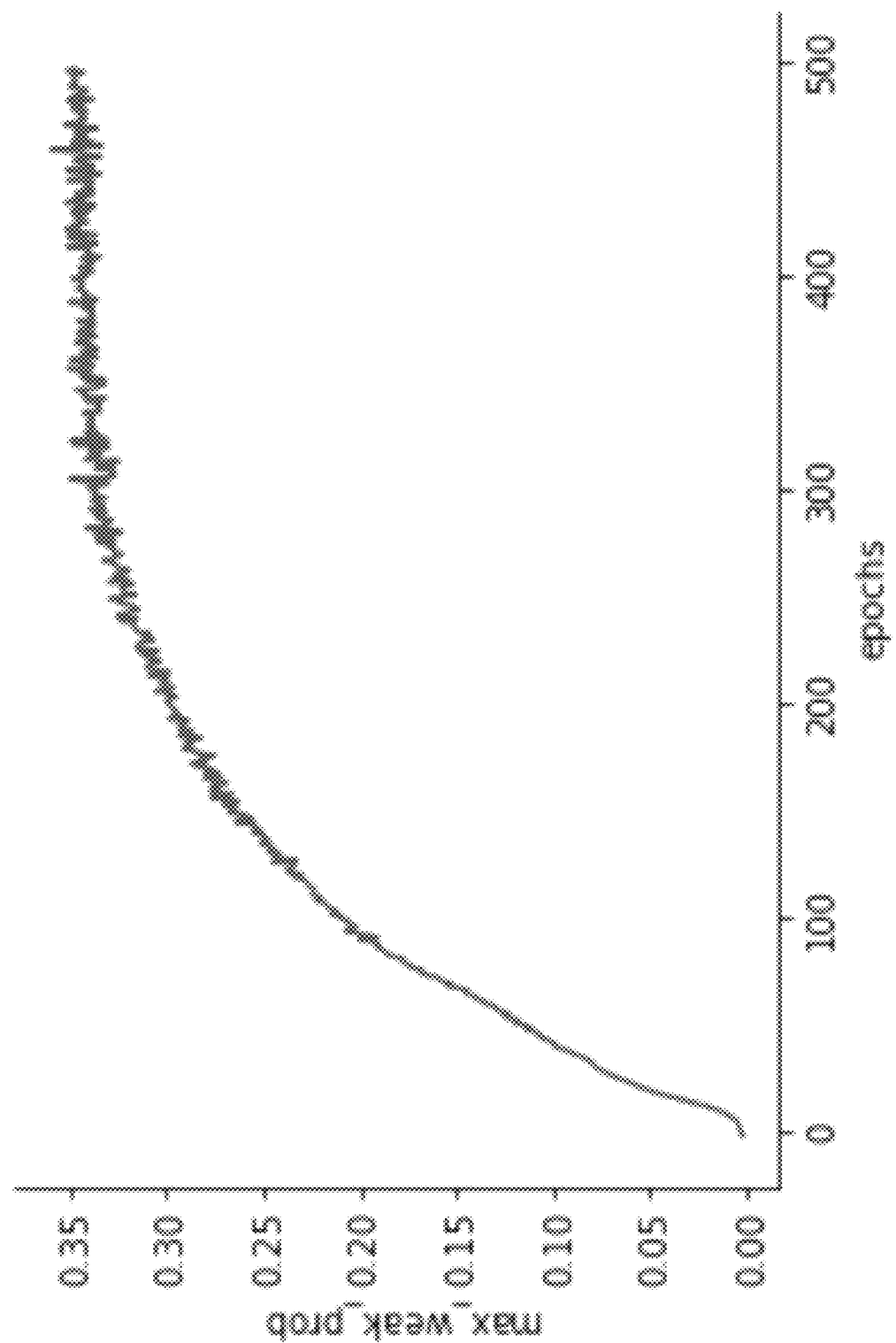
FIG. 6 illustrates an example weak prediction curve during training.

FIG. 6 illustrates an example weak prediction curve during training. FIG. 6 visualizes the averaged max probability in weak prediction throughout training phase. As shown in FIG. 6, it shows at early stages, the max probability is near zero and then it will gradually increase and converge. This graph indicates the feature is not capable of mining potential positive instances initially but as training goes on, prediction becomes more confident and accurate (demonstrated in FIG. 5). It again empirically proves that weak predictions may not be reliable at initial steps and linear ramping is useful.

Experiments were also conducted to study the effect of the mix ratio. The complete results are shown in Table 4. The representation learned only using RGB frames under Linear Probe setting on UCF101 and HMDB51 was compared. Ramping step is fixed at 250 for all experiment settings. All methods are pretrained with 500 epochs on UCF101 split 1. Experiments using Weak Teacher method were compared with the InfoNCE baseline. It seems that the mix ratio does not affect much as the ramping step does. From the table, the Weak Teacher model performs reasonably well when α=0.8 or 0.7.

TABLE 4

Ablation Studies on Mix Ratio of Weak Teacher Algorithm.

| Method | UCF101 Acc@1 | Retrieval R@1 |
|---|---|---|
| InfoNCE | 46.8 | 33.1 |
| InfoNCE | 48.1 | 36.2 |

TABLE 4-continued

Ablation Studies on Mix Ratio of Weak Teacher Algorithm.

| Method | UCF101 Acc@1 | Retrieval R@1 |
|---|---|---|
| Weak Teacher$_{a=0.9}$ | 48.7 | 38.4 |
| Weak Teacher$_{a=0.8}$ | 49.6 | 37.8 |
| Weak Teacher$_{a=0.7}$ | 49.1 | 39.7 |

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of contrastive learning with a teacher-student framework to train a neural network for video retrieval, the method comprising:
receiving an input comprising unlabeled video samples;
generating a set of strongly-augmented video samples by performing one or more of random scaling, random horizontal flip, color jitter, random gray and Gaussian Blur on the unlabeled video samples and a set of weakly-augmented samples by performing one or more of scaling and cropping of the unlabeled video samples;
encoding, by a student model, the set of strongly-augmented video samples into a first representation, by a first teacher model, the set of strongly-augmented samples into a second representation, and by a second teacher model sharing one or more model parameters with the first teacher model, the set of weakly-augmented samples into a third representation;

generating a set of predictive logits by comparing the first representation to the second representation and comparing the first representation to a first plurality of video samples from the set of strongly-augmented video samples;

generating a set of artificial labels by modifying a set of one-hot labels by comparing the third representation and a second plurality of video samples from the set of weakly augmented video samples;

computing a loss objective based on a comparison of the set of predictive logits and the set of artificial labels;

training the student model based on the loss objective via backpropagation;

updating the shared parameters for the first teacher model and the second teacher model based on the trained student model;

receiving, via a user interface, a user query relating to a video retrieval task; and retrieving, using the trained student model, a video from a plurality of videos in response to the user query.

2. The method of claim 1, wherein the generating the set of predictive logits further comprises:

encoding, by the student model the set of strongly-augmented samples into a query representation; and encoding, by the first teacher model, the set of strongly-augmented samples into a positive key representation.

3. The method of claim 2, further comprising:

generating a similarity by comparing a positive pair of the query representation and the positive key representation with negative pairs of the query and negative key representations corresponding to the query representation in an encoded feature space; and generating the set of predictive logits based on the similarity.

4. The method of claim 1, wherein the student model comprises a convolutional neural network encoder, and the first teacher model comprises a momentarily-updated encoder.

5. The method of claim 1, wherein the generating the set of artificial labels further comprises:

encoding, by the second teacher model, the set of weakly-augmented samples into a weak query representation; and generating a negative similarity based on the weak query representation with weakly-augmented negative key representations.

6. The method of claim 5, further comprising:

computing the set of artificial labels by weighted combination of the one-hot labels and the negative similarity according to a mixed ratio.

7. The method of claim 6, further comprising:

adjusting the mixed ratio by linearly reducing the mixed ratio for a ramping step for each training epoch.

8. The method of claim 1, wherein the set of strongly-augmented samples are obtained by random scaling.

9. The method of claim 1, wherein the set of weakly-augmented samples are obtained by any combination of scaling and center cropping.

10. A system for contrastive learning with a teacher-student framework to train a neural network for video retrieval, the system comprising:

a memory storing instructions for contrastive learning with a teacher-student framework; and a processor configured to read and execute the instructions from the memory to perform a method comprising:

receiving an input comprising unlabeled video samples;

generating a set of strongly-augmented video samples by performing one or more of random scaling, random horizontal flip, color jitter, random gray and Gaussian Blur and a set of weakly-augmented samples by performing one or more of scaling and cropping of the unlabeled video samples;

encoding, by a student model, the set of strongly-augmented video samples into a first representation, by a first teacher model, the set of strongly-augmented samples into a second representation, and by a second teacher model sharing one or more model parameters with the first teacher model, the set of weakly-augmented samples into a third representation;

generating a set of predictive logits by comparing the first representation to the second representation and comparing the first representation to a first plurality of video samples from the set of strongly-augmented video samples;

generating a set of artificial labels by modifying a set of one-hot labels by comparing the third representation and a second plurality of video samples from the set of weakly augmented video samples;

computing a loss objective based on a comparison of the set of predictive logits and the set of artificial labels;

training the student model based on the loss objective via backpropagation;

updating the shared parameters for the first teacher model and the second teacher model based on the trained student model;

receiving, via a user interface, a user query relating to a video retrieval task; and retrieving, using the trained student model, a video from a plurality of videos in response to the user query.

11. The system of claim 10, wherein the generating the set of predictive logits further comprises:

encoding, by the student model the set of strongly-augmented samples into a query representation; and encoding, by the first teacher model, the set of strongly-augmented samples into a positive key representation.

12. The system of claim 11, further comprising:

generating a similarity by comparing a positive pair of the query representation and the positive key representation with negative pairs of the query and negative key representations corresponding to the query representation in an encoded feature space; and generating the set of predictive logits based on the similarity.

13. The system of claim 10, wherein the student model comprises a convolutional neural network encoder, and the first teacher model comprises a momentarily-updated encoder.

14. The system of claim 10, wherein the generating the set of artificial labels further comprises:

encoding, by the second teacher model, the set of weakly-augmented samples into a weak query representation; and generating a negative similarity based on the weak query representation with weakly-augmented negative key representations.

15. The system of claim 14, further comprising:

computing the set of artificial labels by a weighted combination of the one-hot labels and the negative similarity according to a mixed ratio.

16. The system of claim 15, further comprising:
adjusting the mixed ratio by linearly reducing the mixed ratio for a ramping step for each training epoch.

17. The system of claim 10, wherein the set of strongly-augmented samples are obtained by random scaling.

18. The system of claim 10, wherein the set of weakly-augmented samples are obtained by any combination of scaling and center cropping.

19. A non-transitory processor-readable storage medium storing processor-executable instructions for self-supervised training of a dialogue state tracking (DST) module, the instructions being executed by a processor to perform a method comprising:
receiving an input comprising unlabeled video samples;
generating a set of strongly-augmented video samples by performing one or more of random scaling, random horizontal flip, color jitter, random gray and Gaussian Blur on the unlabeled video samples and a set of weakly-augmented samples by performing one or more of scaling and cropping of the unlabeled video samples;
encoding, by a student model, the set of strongly-augmented video samples into a first representation, by a first teacher model, the set of strongly-augmented samples into a second representation, and by a second teacher model sharing one or more model parameters with the first teacher model, the set of weakly-augmented samples into a third representation;
generating a set of predictive logits by comparing the first representation to the second representation and comparing the first representation to a first plurality of video samples from the set of strongly-augmented video samples;
generating a set of artificial labels by modifying a set of one-hot labels by comparing the third representation and a second plurality of video samples from the set of weakly augmented video samples;
computing a loss objective based on a comparison of the set of predictive logits and the set of artificial labels;
training the student model based on the loss objective via backpropagation;
updating the shared parameters for the first teacher model and the second teacher model based on the trained student model;
receiving, via a user interface, a user query relating to a video retrieval task; and
retrieving, using the trained student model, a video from a plurality of videos in response to the user query.

20. The non-transitory processor-readable storage medium of claim 19, wherein the student model comprises a convolutional neural network encoder, and the first teacher model comprises a momentarily-updated encoder.

* * * * *